(12) United States Patent
Smalley

(10) Patent No.: US 11,130,287 B2
(45) Date of Patent: Sep. 28, 2021

(54) OPTICAL TRAP 3D PRINTING

(71) Applicant: Brigham Young University, Provo, UT (US)

(72) Inventor: Daniel Smalley, Provo, UT (US)

(*) Notice: Subject to any disclaimer, the term of this patent is extended or adjusted under 35 U.S.C. 154(b) by 134 days.

(21) Appl. No.: 16/255,642

(22) Filed: Jan. 23, 2019

(65) Prior Publication Data

US 2019/0224916 A1 Jul. 25, 2019

Related U.S. Application Data

(60) Provisional application No. 62/620,906, filed on Jan. 23, 2018.

(51) Int. Cl.

| *B29C 64/264* | (2017.01) |
| *G21K 1/00* | (2006.01) |
| *B29C 64/205* | (2017.01) |
| *B29C 64/307* | (2017.01) |
| *B29C 64/277* | (2017.01) |
| *B29C 64/10* | (2017.01) |
| *B33Y 40/00* | (2020.01) |
| *B33Y 10/00* | (2015.01) |
| *B33Y 30/00* | (2015.01) |

(52) U.S. Cl.
CPC .......... *B29C 64/264* (2017.08); *B29C 64/10* (2017.08); *B29C 64/205* (2017.08); *B29C 64/277* (2017.08); *B29C 64/307* (2017.08); *G21K 1/006* (2013.01); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

| 10,500,796 B1* | 12/2019 | Lazarovits | ............ B29C 64/129 |
| 2015/0183168 A1* | 7/2015 | Liverman | ............ B29C 64/386 |
| | | | 264/401 |
| 2016/0161068 A1* | 6/2016 | Smalley | ................. G03B 21/00 |
| | | | 362/84 |

* cited by examiner

*Primary Examiner* — Marc C Howell
*Assistant Examiner* — John J DeRusso
(74) *Attorney, Agent, or Firm* — Strong & Hanni, P.C.; Joseph Shapiro

(57) ABSTRACT

A system for three-dimensional (3D) optical trap printing (OTP) comprises a first particle susceptible to being cured by a light beam, a first light source to generate a trapping light beam to trap the particle, and a second light source to generate a curing light beam to cure the first particle. Using scanning and other optics, the trapping light beam may move the first particle to a desired printing location at which the curing light beam may cure the first particle, thereby adding the first particle to a printed structure. Using OTP, structures may be printed in any orientation, with or without support structures. Additionally, OTP allows for printing composite materials, high resolution color printing, printing of complex structures without sacrificial filler material, simultaneous printing of multiple particles, and combining particles at a print location.

22 Claims, 19 Drawing Sheets

OPTICAL TRAP 3D PRINTING

BACKGROUND OF THE INVENTION

In recent years, 3D printing technology has made significant advances, moving into the mainstream and becoming widely available. Notwithstanding these advances, 3D printing still suffers from significant shortcomings. For example, extrusion and SLA/STL 3D printers are limited to printing in layers, and also require support structures, i.e., generally a flat surface to print on. Additionally, SLA/STL 3D printing requires immersion of the support structure in a liquid. Layer printing is further problematic because it often necessitates sacrificial support structures, e.g., for 3D printing of tissue scaffolding. Additionally, immersive printing technologies, (e.g., SLA/STL 3D printing) require a large amount of material (the immersion reservoir), but most of the material is unused during a printing event.

Another limitation of immersive printing technologies is that—other than unwieldy conveyor belt approaches—the size/dimensions of the item being printed is limited to the volume of the printer.

Additionally, immersive printing technologies are generally limited to printing one color or material at a time. Changing materials or colors is often cumbersome even if the printer has multiple writeheads. Even for immersive printers that have multiple-color capability, the resolution for multiple colors is limited.

Immersive printers are also generally limited to printing on one axis and on one surface.

Additionally, most immersive printers rely on and are therefore limited to a single chemical reaction (e.g., polymerization of resin or phase change of plastic or sintering of metal).

Optical trap display ("OTP") is a recently developed 3D display technology that overcomes shortcomings with existing 3D displays and may have applications in other fields.

As shown in FIG. 11, an OTP system 1100 may include one or more first light sources (e.g., lasers, light emitting diodes, etc.) 1102 that may be used to trap and manipulate the positions of one or more particles. System 1100 further includes one or more second light sources (e.g., lasers, light emitting diodes, etc.) 1104 that may be used to illuminate the particles with a variety of different colors that may be mixed to provide a full spectrum of visible light. In some implementations, the first light source(s) 1102 may include a laser that operates at a wavelength in the electromagnetic spectrum, which is not within the range of human vision. For example, the first light source 1102 may include an infrared laser that provides electromagnetic radiation having a wavelength longer than about 800 nm. The second light source(s) 1104 may include a plurality of lasers (e.g., solid state lasers) that operate at different wavelengths within the visible spectrum. For example, the second light sources 1104 may include a red laser, a green laser, and a blue laser.

The electromagnetic radiation from first light source 1102 and second light source 1104 may be combined by an optical element (e.g., a beam splitter) 1106, so that the electromagnetic radiation from the two light sources 1102 and 1104 travels co-linearly through scanning and focusing optical elements 1108. Optical elements 1108 may focus the electromagnetic radiation from light sources 1102 and 1104 to a focal point 1110. One or more particles may be trapped and manipulated by the light from first light source 1102 as a result of interactions of the particle with the light. In some implementations, particles may be trapped at the focal point 1110 by forces created by the focused beam(s) of light from one or more of the light sources. In some implementations, the beam waist of the focused light from the first light source 1102 may create a gradient force trap, in which a strong electric field gradient attracts dielectric particles along the gradient to the region of the strongest electric field at the center of the beam waist. Thus, a particle trapped by the gradient force trap of the light from first light source 1102 may remain fixed in place in three-dimensional space. In some implementations, particles may be trapped in potential wells very near focal point 1110, where the location of the minimum potential of the wells results from the combination of a gradient trapping force toward the minimum beam waist location and a radiation pressure force in a direction of propagation of the light beam. In some implementations, particles may be trapped due to non-uniform heating of the particle by the light. In some implementations, a beam waist having an intensity profile that initially increases with increasing radius (e.g., a "doughnut hole" profile) may be used to trap particles, as particles may be attracted to lower intensity regions within the beam waist.

In addition, the light beam that traps a particle may be scanned within the three-dimensional space, and while the light beam is scanned, the trapped particle may be dragged through the three-dimensional space by the forces created by the focused beam from first light source 1102. In some implementations, the light beam(s) produced by first source(s) 1102 and second source(s) 1104 also may be used to orient the trapped particle within the three-dimensional space. For example, the light beam(s) produced by first source(s) 1102 and second source(s) 1104 may be used to create rotational forces on the particle to turn and orient the particle at a fixed location in space. The manipulation of particle orientation may be accomplished by modifying the amplitude or polarization of the holding beam. For example, by tilting the lens through which the holding beam passes the light field may become skewed and asymmetric and may favor a change in particle orientation.

Light from second light sources 1104 also may be focused to focal point 1110. In some implementations, light from second light sources 1104 may be scattered off the trapped particle, and the scattered light may be viewed by a viewer. In some implementations, light from the second light sources may be absorbed by the trapped particle, which then, in response to the absorbed light, may emit fluorescence radiation that may be viewed by a viewer. In such an implementation both the first and second sources may be invisible to the human eye, leaving only the light emitted by the particle to be observed without being degraded by other visible sources. Light from second light sources 1104 may include light having a plurality of different wavelengths. For example, red, green, and blue light may be provided by second light sources 1104.

In some implementations, the trapped particle may include a PN junction with a light emitting band gap such as a light emitting diode or laser diode. For example, in some implementations, the trapped particle may include an optical laser cavity with a partially reflecting mirror at one end of the cavity and a high-reflectivity mirror at the other end of the cavity. Light from the second and/or first laser beam stimulate the emission of light having a wavelength corresponding to the band gap and the stimulated emission may be multiplied within the laser cavity, which a portion of the light in the cavity is coupled out of the cavity through the partially-reflecting mirror to produce laser light. The laser light may be emitted in a preferential direction defined by the geometry of the laser cavity of the particle.

In some implementations in which the trapped particle includes a PN junction with a light emitting band gap, the first light source 1102 may both trap and manipulate the orientation of the PN junction as well as provide pumping energy to the PN junction of the particle. When energized, the particle may emit stimulated light such as laser light that may be visible and highly directional. The first light beam(s) from first light source(s) 1102 may be used to trap, pump, modulate and steer the luminous particle's output.

The intensities of the different colors may be controlled by a computer system, and by controlling the intensities of the different colors, any arbitrary color within the spectrum of human vision may be provided to the focal point 1110 at which the trapped particle is held. The focusing and scanning optical elements 1108 also may be subject to control by the computer system, such that the focal point 1110 may be moved to different positions within the three-dimensional space as determined by the computer system.

By scanning the focal point 1110 through the three-dimensional space, a full-color volumetric display may be created. For example, by rastering the focal point 1110 through the three-dimensional space at a rapid rate (e.g., at a rate faster than the response rate of the human eye) an image of a three-dimensional object may be created in space for viewing by a viewer.

Because the position and orientation of the particle may be manipulated in freespace, the illuminated particle may be used to draw images immediately adjacent to physical objects, including observers, in the environment. For example, a particle trapped in the focal point of the first light beam may be repeatedly translated in a pattern in the air while the second light beam stimulates the particle to emit emission light. When the pattern is repeated at a rate that is faster than the response of the human eye, (e.g., a at rate greater than 20 Hz), the pattern may appear to be solid in space. In this manner, three-dimensional objects may appear to be created in space. The co-location of such objects created from the interaction of light with one or more trapped particles and observers may be used to facilitate human interaction with an image by touch.

FIG. 12 is another schematic diagram of a system 1200 for providing a full-color, volumetric display. The system includes a first light source 1202 that provides electromagnetic radiation that is focused by scanning and focusing optical elements 1204 to a focal point 1206. Light from the first light source 1202, when focused to the focal point 1206 may create a gradient force trap that may trap a particle within the beam waist of the focused beam at the focal point 1206.

System 1200 may include a plurality of second light sources 1208, 1212, 1216 and respective scanning and focusing optical elements 1210, 1214, 1218, which, in conjunction with each other, may focus light from the second light sources to the focal point 1206. Light from the second light sources 1208, 1212, 1216 may illuminate the trapped particle at the focal point 1206, and scattered or fluorescence light from the trapped particle may be viewed by a viewer.

A computer system may control the light sources 1202, 1208, 1212, 1216 (e.g., the intensities of light emitted from the light sources) and may control the scanning and focusing optical elements 1204, 1210, 1214, 1218. For example, the computer system may control the scanning and focusing optical elements to move the focal point 1206 within the three-dimensional space. By scanning focal point 1206 through the three-dimensional space, a full-color volumetric display may be created. For example, by rastering focal point 1206 through the three-dimensional space at a rapid rate (e.g., at a rate faster than the response rate of the human eye) an image of a three-dimensional object may be created in space for viewing by a viewer.

Particles that are trapped for use in, e.g., systems 1100 and 1200 may be isotropic or anisotropic. FIG. 13 is a schematic diagram of a system 1300 in which an anisotropic particle 1302 is trapped within the beam waist of a beam 1304 of electromagnetic radiation. The particle 1302 is illuminated by visible light from a light source 1306, and light scattered from the particle 1302 may be viewed by a viewer at a first viewing location 1308. Because the particle 1302 is anisotropic, light from the light source 1306 may not be scattered in all directions from the particle. For example, the anisotropic particle 1302 may occlude scattered light from reaching a viewer at a second viewing location 1310. By using such anisotropic particle 1302 in, e.g., systems 1100 and 1200, full-color volumetric displays may be created in which the entire display, or any particular point or points in the display, may be viewed from an independent preferential direction while preventing the display of the entire display, or the particular point or points in the display, from being viewed from another direction. Anisotropic particles might include, for example, thin wafers of materials, such as silicon, which may be subdivided (e.g., by cleaving, crushing or diesawing) into small flat shapes of materials, which might act as small mirrors that scatter light preferentially in one direction. Similarly, flat particles may be made from liquid materials, such as black liquor, which may be spun to form a thin film and then fractured to create small flat particles. Anisotropic particles may also be formed with multiple facets in silicon, silicon dioxide, silicon nitride and other materials with ion milling and other techniques used to create MEMs devices. These multifacet particles may be shaped as polygonal mirrors with mirrors along one or more axes. These particles might also include complex prism structures.

What is needed is a 3D printing technology that overcomes, in whole or in part, some or all of these limitations for 3D printers described above, including but not limited to the limitations described above for immersive 3D printing technologies.

BRIEF SUMMARY OF THE INVENTION

An improved system and method are disclosed for 3D printing using optical trap 3D printing ("OTP"). As described herein, optical trapping comprises using a trapping light beam to trap a particle at or near the focus of the light beam, i.e., the "beam waist." Using scanning optical elements, the trapping light beam may move the trapped particle to a desired location at where the particle "printed," i.e., added to a structure by using a second light beam to cure the particle. A particle may be a liquid, solid, hybrid, other phase, more complex structure.

Because a particle may be printed at any location accessible by a light beam, structures may be printed in many patterns and orientations, with or without support structures and/or sacrificial material.

In one embodiment, OTP may be used to print composite material by printing particles of various types or materials in a pattern comprising a composite material.

In another embodiment, OTP may print structures with fine resolution, e.g., color, mechanical structures, and other features, by placing and curing particles having different properties (e.g., color using an RGB color scheme) when cured.

In another embodiment, because OTP allows for printing a particle at any location accessible by light, OTP may print complex structures, e.g., tissue scaffolding, without the need for sacrificial filler material.

In another embodiment, multiple trapping beams and multiple curing beams may be used to simultaneously add multiple particles to a structure.

In one embodiment, exothermic heat release from curing a particle, and potential interference from such heat release on the curing of a different particle, may be avoided or mitigated by curing particles in waves.

In another embodiment, OTP may combine "A" particles and "B" particles in situ, and the resulting product particle may then become susceptible to curing, even though not susceptible to curing prior to being combined.

An exemplary method for printing a structure using OTP is disclosed. This method may comprise using a trapping beam to trap a particle, determining whether the particle needs to be moved, moving the particle if necessary, and curing the particle to add it to a structure.

DETAILED DESCRIPTION OF THE INVENTION

Figure 1A:
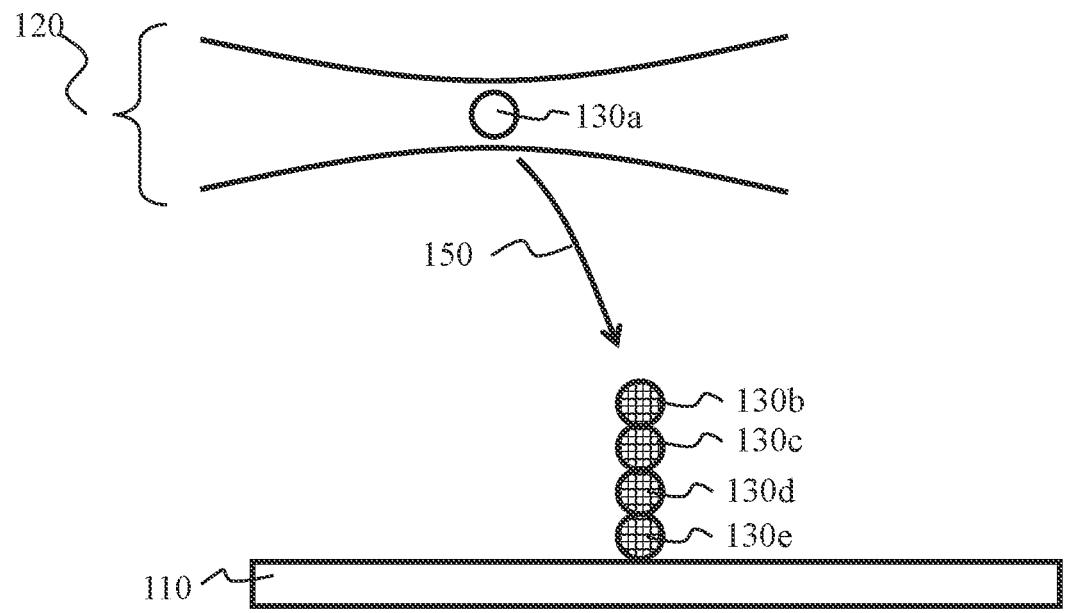
FIGS. 1a-1d show an exemplary embodiment for using OTP to print a structure.

This application claims priority to U.S. Provisional Application No. 62/620,906, which is incorporated herein by reference in its entirety, filed on Jan. 23, 2018, the first inventor of which is Daniel Smalley, and which is titled "Optical Trap 3D Printing."

An improved system and method are disclosed for 3D printing using optical trap 3D printing ("OTP").

TABLE OF REFERENCE NUMBERS FROM DRAWINGS

The following table is for convenience only, and should not be construed to supersede any potentially inconsistent disclosure herein.

| Reference Number | Description |
| --- | --- |
| 110 | support structure |
| 120 | trapping beam |
| 121 | trapping beam |
| 122 | trapping beam |
| 130a-n | particles |
| 140 | chemically combined particle |
| 150 | arrow showing direction/path of movement of particle as controlled by trapping beam |
| 151 | arrow showing direction/path of movement of particle as controlled by trapping beam |
| 160 | curing beam |
| 161 | curing beam |
| 162 | curing beam |
| 200 | exemplary OTP method |
| 210 | step in method 200 |
| 220 | step in method 200 |
| 230 | step in method 200 |
| 240 | step in method 200 |
| 1100 | system for providing optical trap display |
| 1102 | first light source in system 1100 |
| 1104 | second light source in system 1100 |
| 1106 | optical element, e.g., beam splitter |
| 1108 | focusing and scanning optical elements |
| 1110 | focal point |
| 1200 | system for providing optical trap display |
| 1202 | first light source in system 1200 |
| 1204 | focusing and scanning optical elements |
| 1206 | focal point |
| 1208 | second light source |
| 1210 | focusing optical elements |
| 1212 | second light source |
| 1214 | focusing optical elements |
| 1216 | second light source |
| 1218 | focusing optical elements |
| 1300 | system in which anisotropic particle is trapped with beam waist |
| 1302 | anisotropic particle |
| 1304 | beam |
| 1306 | light source |
| 1308 | first viewing location |
| 1310 | second viewing location |

As disclosed herein, an optical trap printer, or optical trap printing ("OTP"), may be used to selectively print features or items in-situ, on existing surfaces (not limited to support surfaces), in any orientation (not restricted to printing by layers parallel to a support surface or other surface), and further without the need to immerse a support or other surface in a liquid. Additionally, where multiple support surfaces are used, OTP may print simultaneously on the multiple support surfaces.

In some embodiments, OTP may not require any surface at all, and may 3D print features or items in air or another liquid. For example, an OTP printer, if operated quickly enough, could print an object in thin air, e.g., a chain in which each new link would be printed before the last fell from the air to form one continuous chain that could continue forever so long as raw materials were present.

Additionally, because OTP is not limited by a support structure or the movement range of an extrusion nozzle or liquid reservoir, the size of printed features is not limited, and printed features or items may be significantly larger than the OTP equipment itself. In general, using OTP, a structure may be printed anywhere accessible by light, including deep and small areas. For example, OTP may print and carbonize a wirebond on a chip in-situ that is recessed into a computer).

Additionally, unlike most immersive and other 3D printing technologies, OTP does not require the presence of a large amount—or any amount at all—of unused material. OTP requires only the material that is being actively added.

An additional benefit of OTP is amenability to printing with multiple colors, materials, properties, and other features, and at high resolution. For example, using OTP, each optical trap may be a different color or material. Because each optical trap may be a different color or material, the color or material resolution is limited only by the size of a particle, and hundreds, thousands, or more different colors or materials may be available. For example, the size of an OTP particle—and therefore the color resolution that may be achieved using OTP—may be 10 µm or less.

Trapped Particles

A particle that is susceptible to trapping may be any phase: solid, liquid (e.g., a droplet), gas, plasma, or hybrid (e.g., a solid capsule holding a liquid such as a medicine or a poison).

In some embodiments, a particle may be a complete and complex object such as a microchip, MEMs device or a diode laser that is held and placed in an assembly like an optical "pick and place," and additional particles could be used to connect that object physically and/or electrically to a surrounding structure. In some embodiments, one or more illumination beams could be used to activate the device during printing.

Adding Trapped Particles to Print

A trapped particle may be added to a print or feature of a print by using a trapping beam to move a trapped particle to a desired location, and then curing the particle at the desired location. A particle may be cured by a curing beam or other means.

Because of the precision of a trap light beam, trapped particles can be printed with high precision in a localized area without disturbing the surrounding area, i.e., without unintentionally or undesirably printing nearby trapped particles. For example, a conductive wirebond or wire bridge structure could be printed on a wafer die without immersing the entire chip in a conductive printing material.

A structure printed using OTP may have high precision, resolution, and/or granularity. For example, an OTP may have resolution of one particle.

Because adding a particle to a print may occur at any location or region accessible by light, a feature or structure may be printed horizontally on a vertical surface, or may be printed in any direction or printing order or pattern regardless of orientation of a support surface or directional print pattern relative to a support surface. Because OTP is not subject to layer printing, a support structure for a print may have many different shapes, sizes, and orientations.

FIGS. 1a-1d show an exemplary embodiment for using OTP to print a structure. As shown in FIG. 1a, support structure 110 may support particles 103b-e, which have already been added to a structure that is being printed. Particles 130b-e have been added to a structure by curing the particles while held in the desired printing location by a trapping beam. Particle 130a is a particle that has not yet been cured, and that is trapped in the beam waist of trapping beam 120. The beam waist of beam 120 is the narrowest part of the focused beam. As already described herein above, particle 130a may be trapped by trapping beam 120, and may then be dragged through three-dimensional space by scanning the light source for light beam 120. As shown in FIG. 1a, light beam 120 is dragging particle 130a along path 150 toward the structure comprising cured particles 130b-e. The hatching shown in particles 130b-e signifies that these particles have already been cured and thereby added to the structure being printed. As used in the other drawings and as described and referenced herein, hatching in particles indicates that a particle has been cured.

Figure 1B:
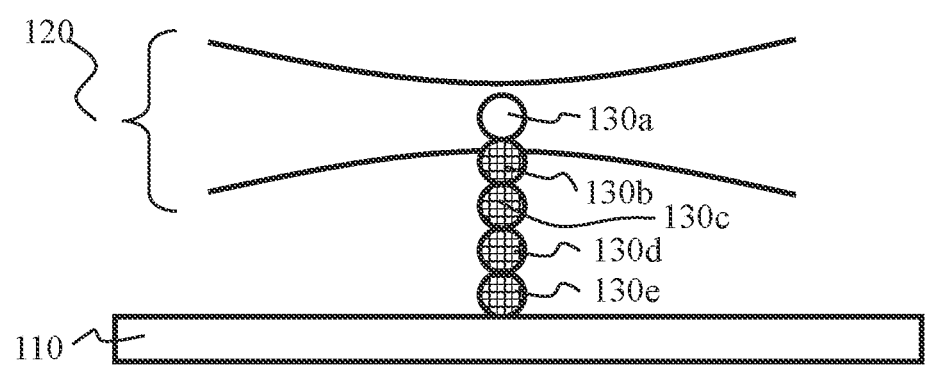

FIG. 1b shows particle 130a from FIG. 1a, after particle 130a has been dragged into place by trapping beam 120, but before particle 130a has been cured.

Figure 1C:
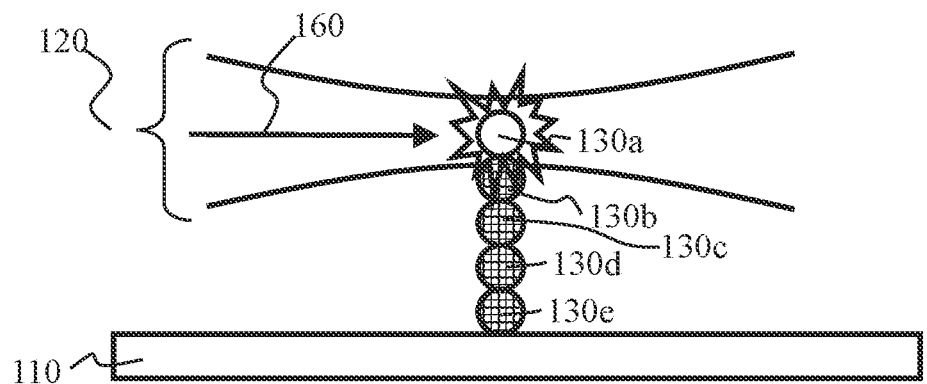

FIG. 1c shows particle 130a being cured by curing beam 160.

Figure 1D:
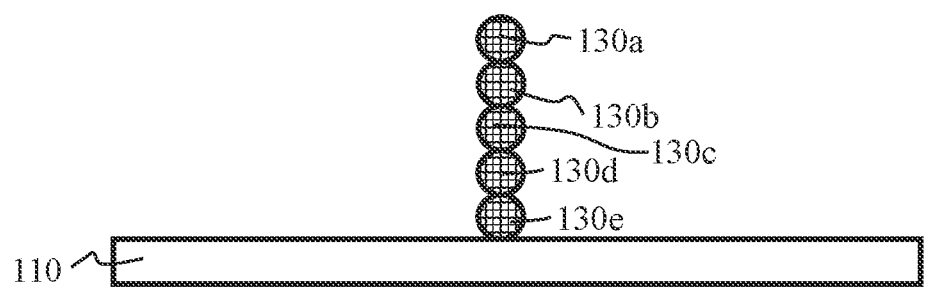

As shown in FIG. 1d, particle 130a has been cured and thereby added to the structure being printed.

Figure 2A:
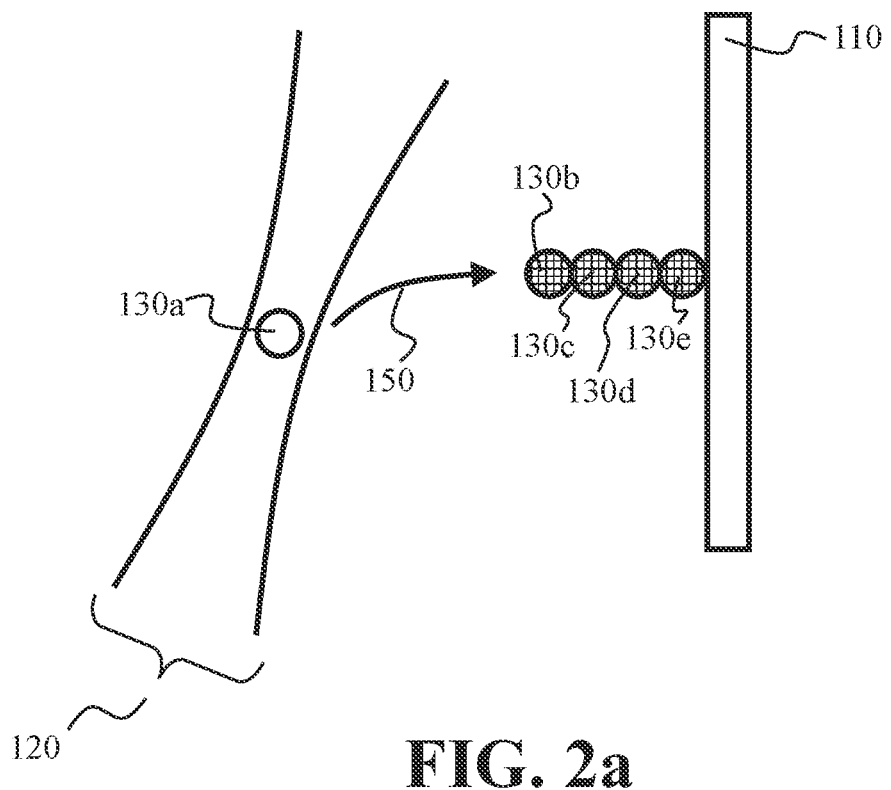
FIGS. 2a-2d show how OTP may be used to print a structure horizontally, secured to a vertical surface.

OTP may be used to print a structure in any orientation, without the need for a gravitational support structure, i.e., a support structure beneath the structure being printed. For example, as shown in FIGS. 2a-2d, OTP may be used to print a structure horizontally based on a vertical surface 110. As shown in FIG. 2a, particles 130b-e are already cured and thereby part of a printed structure based on or secured to vertical surface 110, and trapping beam 120 is dragging uncured particle 130a along path 150 toward the printed structure comprising particles 130b-e.

Figure 2B:
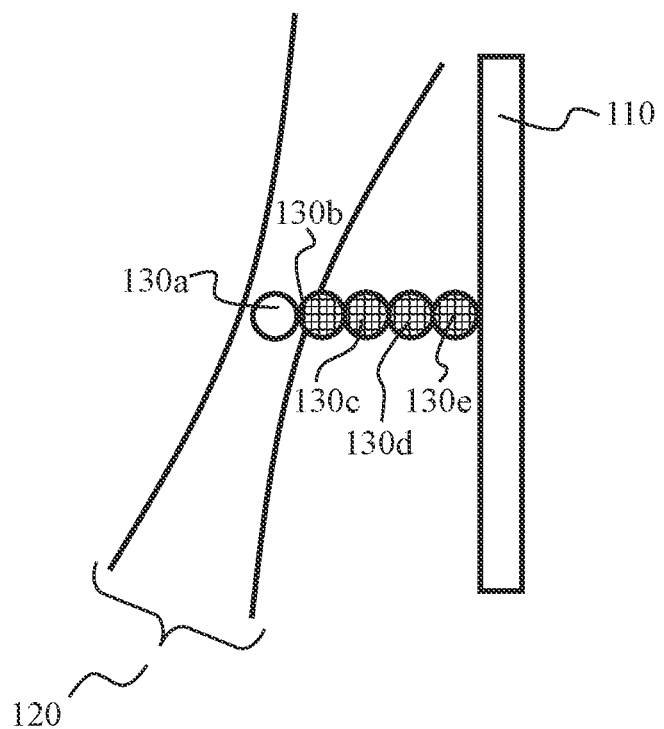

As shown in FIG. 2b, uncured particle 130a has been dragged into position for curing and thereby being added to the already-printed structure comprising particles 130b-e.

Figure 2C:
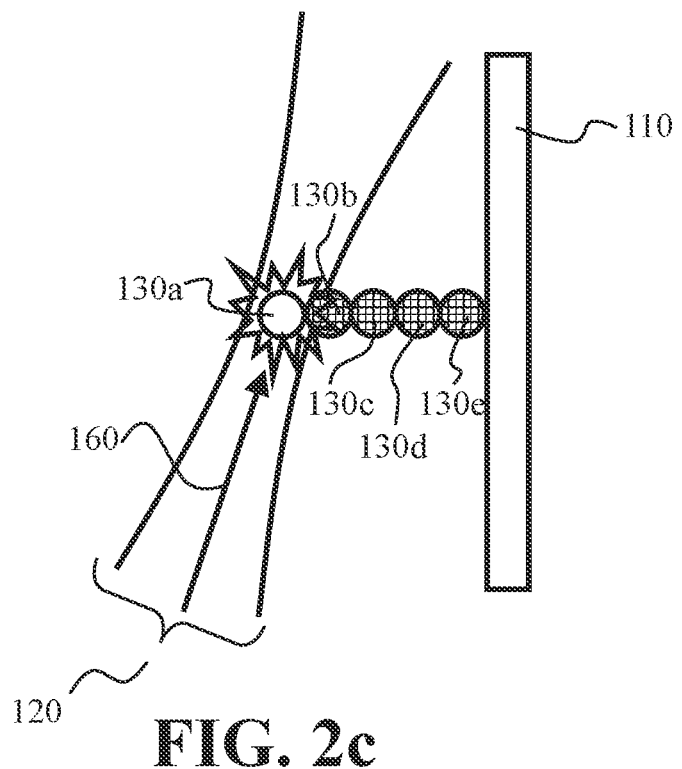

FIG. 2c shows particle 130b being cured by curing beam 160 while held in place by trapping beam 120.

Figure 2D:
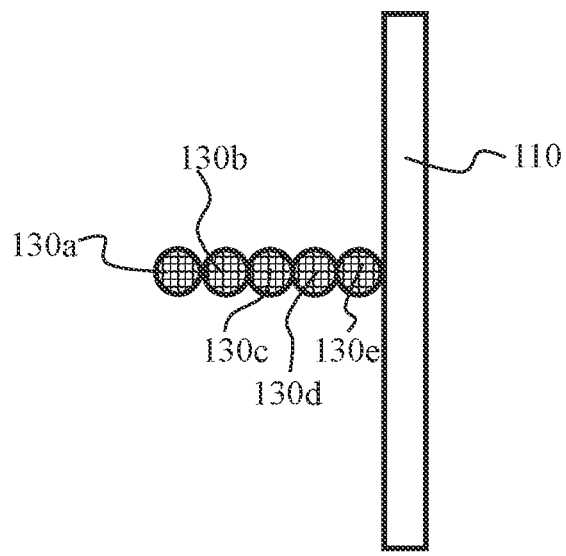

As shown in FIG. 2d, particle 130a has been cured and thereby added to the structure being printed.

Figure 3:
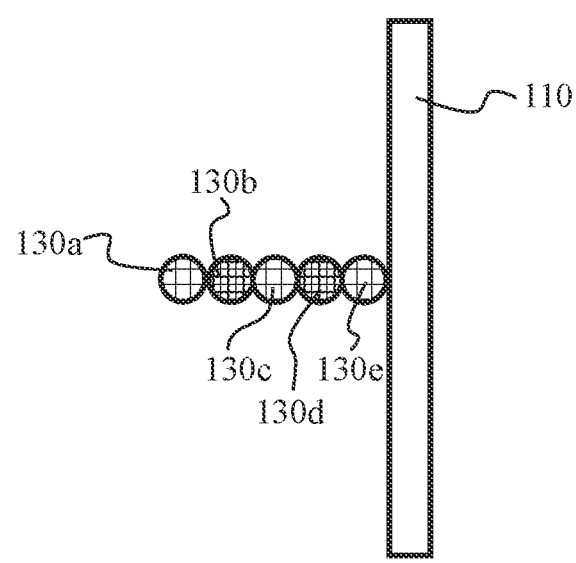
FIG. 3 shows how a printed structure may be printed from a composite material by alternating types of particles or by otherwise adding particles to a structure being printed so that the resulting pattern of particles of different types comprises a composite material.

FIG. 3 is similar to FIGS. 1d and 2d, except that FIG. 3 shows how a printed structure may be printed from a composite material by alternating types of particles or by otherwise adding particles to a structure being printed so that the resulting pattern of particles of different types comprises a composite material. FIG. 3 does not show the processing of dragging a particle to the structure and then curing it on the structure (as shown in FIGS. 1a-3c and 2a-2c,) but instead illustrates the particle pattern after particles 130a-130e have been cured. For example, as shown in FIG. 3, particles 130a-e have all been cured and added to the structure being printed, but particles 130a, 130c, and 130e are a first particle type (signified in FIG. 3 by the large hatching pattern) and particles 130b and 130d are a second particle type. In this example, alternating the particle types as shown in FIG. 3 may result in a composite material or may result in other desirable properties.

In one embodiment, several trapped particles may be added to the print simultaneously by multiple trapping beams and multiple curing beams.

By adding multiple particles to the print simultaneously, composite materials may be added to the print. For example, in some embodiments, a composite may comprise one or more "A" particles and one or more "B" particles, where adding an "A" particle adjacent to a "B" particle results in a composite material. As will be appreciated by a person of ordinary skill in the art, composite materials may be created in multiple ways: placing particles in a specific pattern and in specific proportions, causing a reaction to occur between two particles, or by adding particles to a print. For example, placing "A" particles and "B" particles in a pattern may result in the creation of a particular composite material. By adding multiple particles simultaneously, a composite may be printed in one step. A composite material may alternatively be added by adding multiple particles serially, or otherwise non-simultaneously.

Because multiple particles of different types may be added to the print simultaneously, full color items may be printed in one step. For example, by simultaneously printing a particular proportion and/or pattern of "red" particles, "green" particles, and "blue" particles, many (if not all) different colors may be made under the RGB color model. The ability to create any color by simultaneously printing various patterns of red, green, and blue particles is a significant improvement over dedicated single color resin trays or single-color filament rolls. Different colors or other features may also be added by printing multiple particles serially, or otherwise non-simultaneously.

Figure 4:
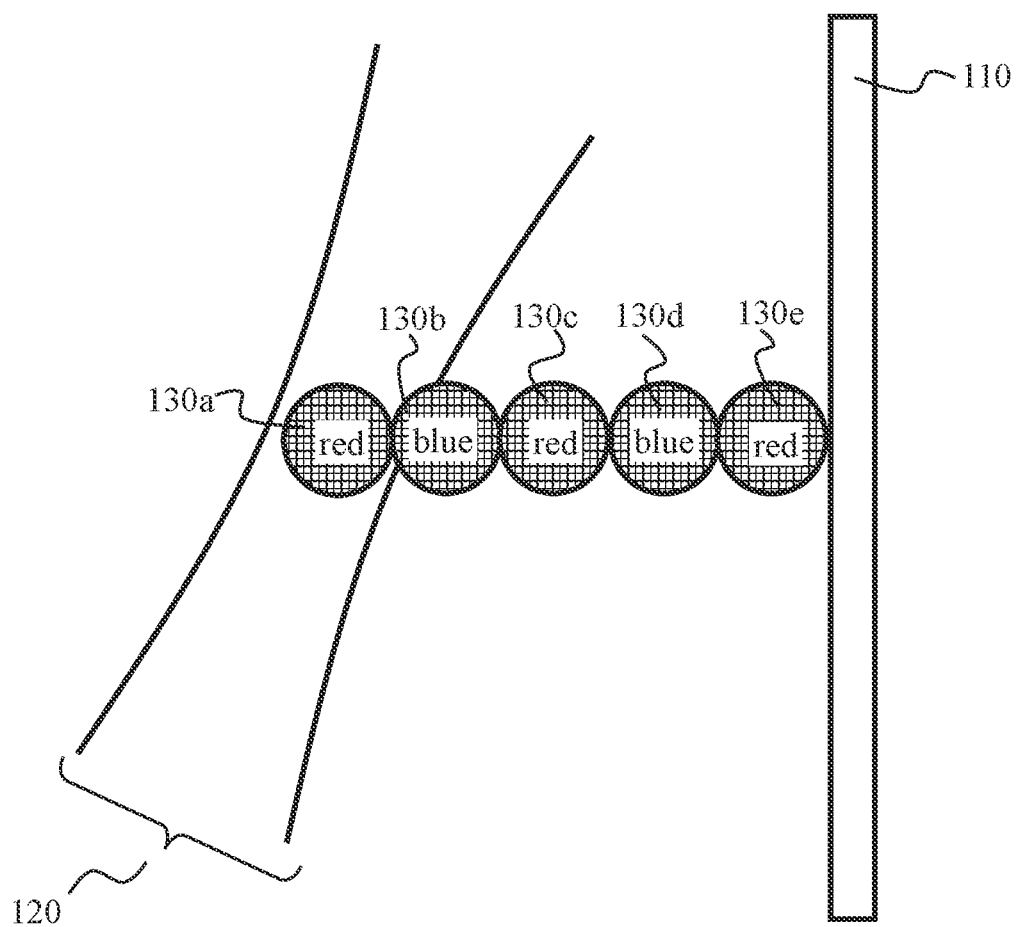
FIG. 4 shows an exemplary printed structure, comprising cured particles, in which red and blue particles have been added to the printed structure in an alternating pattern.

FIG. 4 shows an exemplary printed structure, comprising cured particles 130a-e, in which red and blue particles have been added to the printed structure in an alternating pattern, thereby effectively creating a purple printed structure.

Because OTP allows for adding particles to a print in any sequence, with the potential for no support structure, it may be possible to print features such as tissue scaffolding without undesirable sacrificial filler material. In one embodiment, printing path and orientation may change or be modified real-time as the result of feedback for stability, sagging, or tilting of the print.

Figure 5:
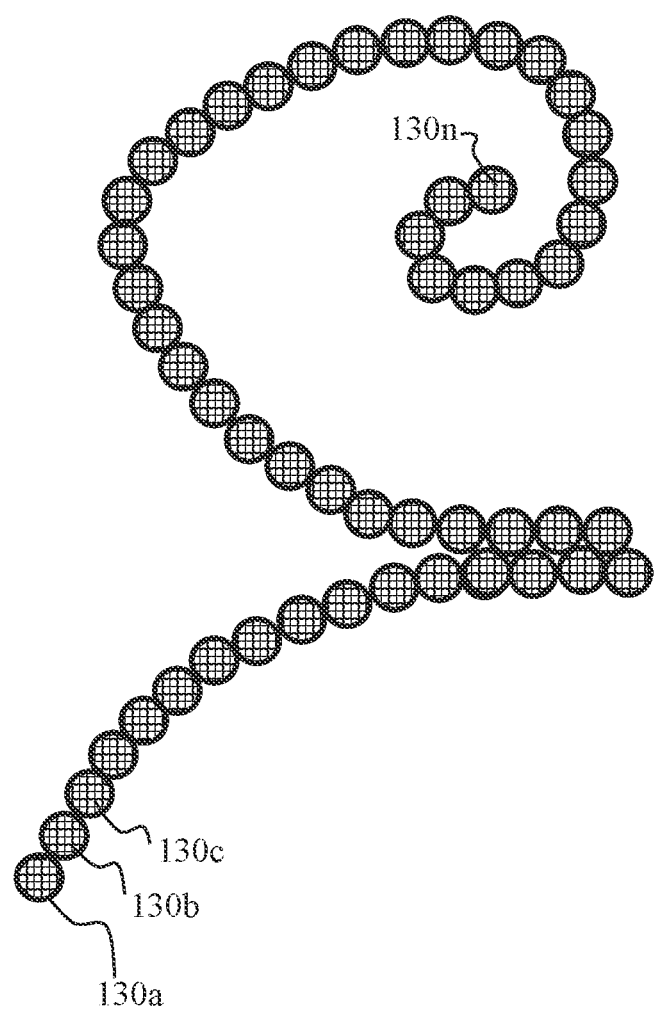
FIG. 5 shows an example of a printed structure comprising multiple particles, e.g., scaffolding, which has been printed using OTP without the need for sacrificial material and without the requirement of support structures.

FIG. 5 shows an example of a printed structure comprising particles 130a-n, e.g., scaffolding, which has been printed using OTP without the need for sacrificial material and without the requirement of support structures. The printed structure shown in FIG. 5 may be printed using OTP as described and disclosed herein.

In addition to a trapping beam, i.e., the beam that is trapping a particle, other beams could be used to implement additional functionality. These additional beams could be optical, acoustic, or other. These additional beams could be collinear with the trapping beam, or could be at other angles. For example, a non-UV (non-ultraviolet) light could be used as a trapping beam, i.e., to hold a resin particle. An additional beam, e.g., a UV beam, could be used to cure the trapped resin particle at the appropriate time and place during a print. The first non-UV beam, the trapping beam, could place and hold-in-place the resin particle, and the additional beam, the UV beam, could them cure the resin particle after the resin particle had been fixed to the printed structure.

Other beams could further be used to perform at least one of the following operations on a trapped particle: adding material, removing material, sintering, adding chemicals, cooking, electrically or optically activating, activating a nonlinear process in the first particle, altering the color, carbonizing or otherwise changing the conductance, changing the adhesive qualities, adding momentum, physically reorienting or manipulating, analyzing, counting, and capturing the shape.

In another embodiment, small particles of food or food ingredients could be trapped and assembled together with one set of beams, while other beams are used to heat and "cook" the structure. Additional beams, such as gamma rays could be used to irradiate the accumulating food particles to prevent spoiling. In this way food could be created, mixed, stirred, cooked and sanitized at the micron level, in parallel, with the exact desired composition, and extremely rapidly (or possible instantly)—all of the food may be cooked simultaneously instead of outside in.

In another embodiment, additional beams may be used to subtract material from the printed structure, to sinter one material to another, to melt one material to another, to acoustically mix suspended liquid particles, to shake a particle to cure a light-sensitive material, to optically pump an active particle, or to illuminate a particle for easy identification. For example, a wirebone could be made using a first beam to trap, move, and deposit a particle that is a material that is conductive when carbonized. Then, when the particle is in place, a second beam may heat and carbonize the particle, but this heating and carbonization may take place only when the particle is properly located-so the now-conductive particle does not short out adjacent electrodes.

Figure 6A:
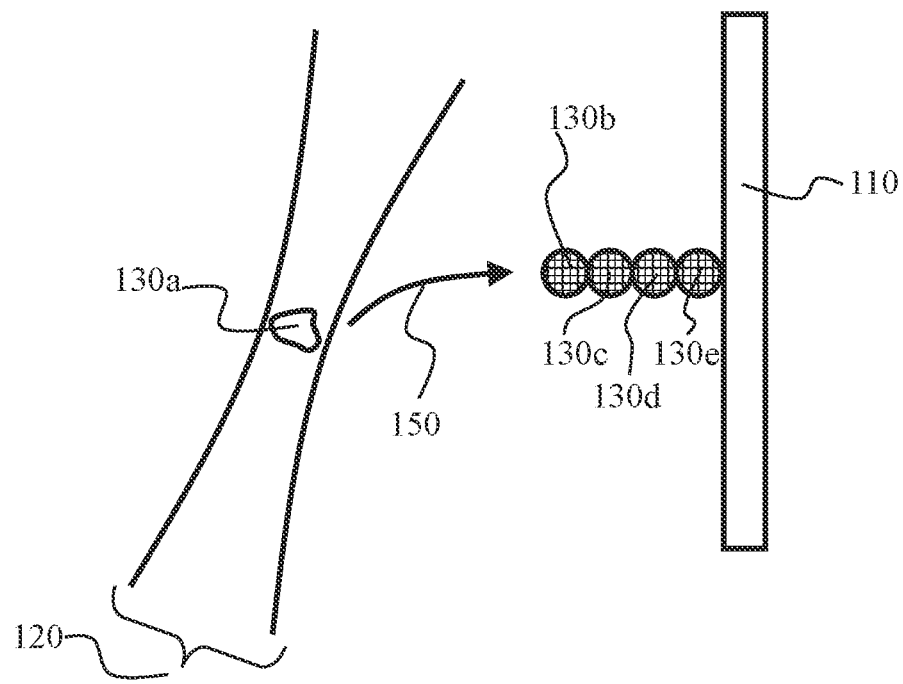
FIGS. 6a-d illustrate an exemplary OTP embodiment in which a particle may be a droplet of a liquid without rigid structure or shape.
Figure 6B:
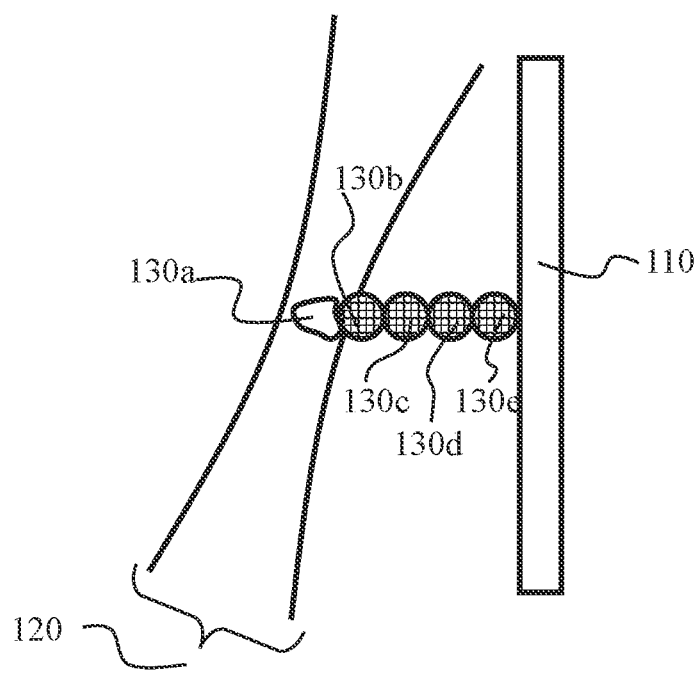
Figure 6C:
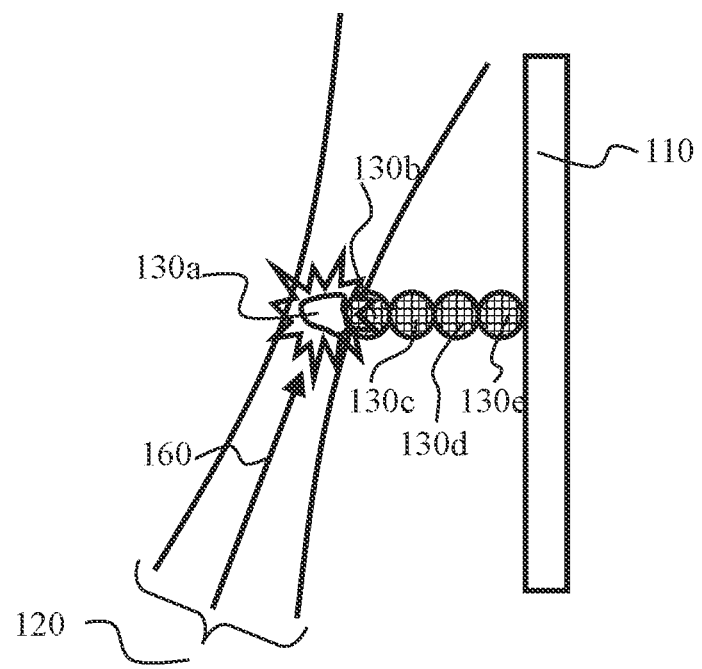
Figure 6D:
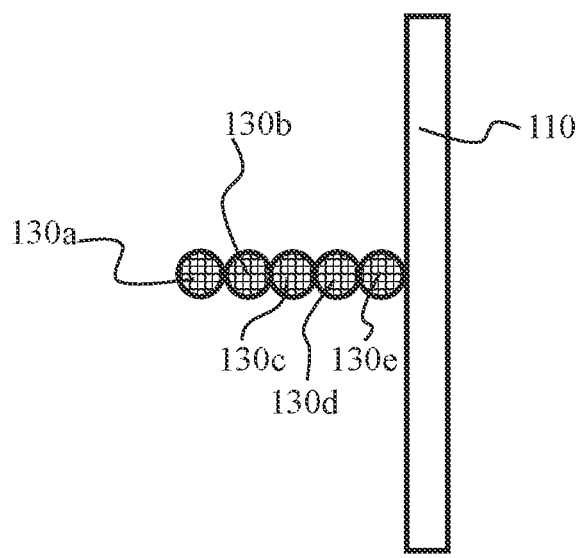

For example, as shown in FIGS. 6a-d, a particle 130a may be a droplet of a liquid without rigid structure or shape. Similar to the process shown in FIGS. 2a-2d and described herein above, trapping beam 120 may trap or suspend droplet 130a and then drag droplet 130a along path 150 (FIG. 6a) to a location adjacent to already-cured particles 130b-e (FIG. 6b). As shown in FIG. 6c, curing beam 160 may be applied to cure droplet 130a (FIG. 6c), thereby adding droplet 130a as a cured particle 130 to the structure being printed.

Figure 7A:
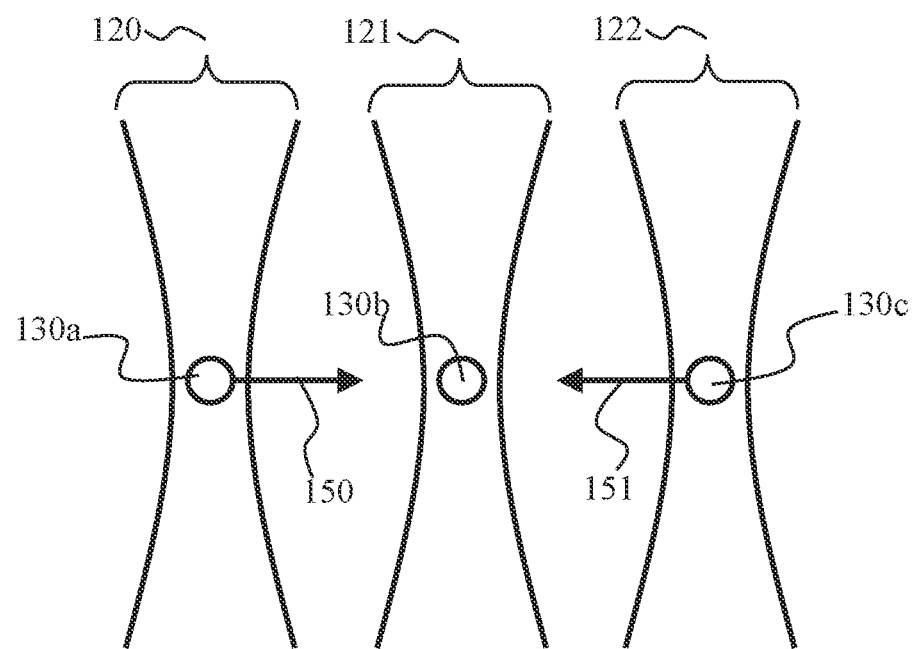
FIGS. 7a-d illustrate an exemplary OTP embodiment in which multiple trapping beams may be used to simultaneously add multiple particles.
Figure 7B:
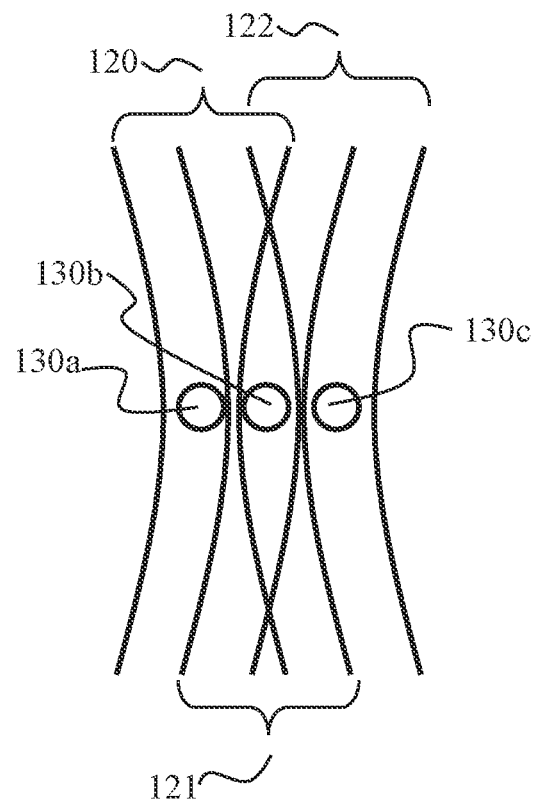

In one embodiment, as shown in FIGS. 7a-7d, multiple trapping beams 120, 121, and 122 may be used to simultaneously add multiple particles, 130a, 130b, and 130c, to a printed structure. As shown in FIG. 7a, three trapping beams 120, 121, and 122 may simultaneously trap particles 130a, 130b, and 130c and drag particles 130a and 130c toward particle 130b along paths 150 and 151. As shown in FIG. 7b, after being dragged, particles 130a, 130b, and 130c may all be held in place near each other by trapping beams 120, 121, and 122.

Figure 7C:
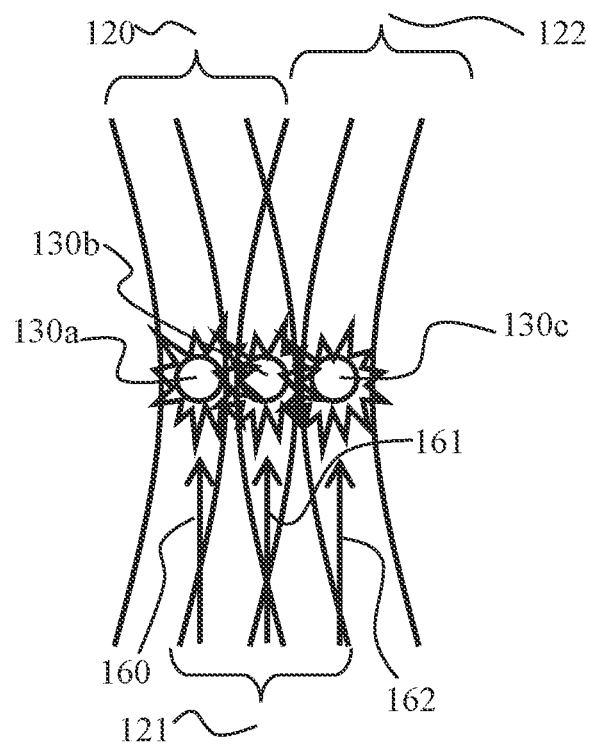
Figure 7D:
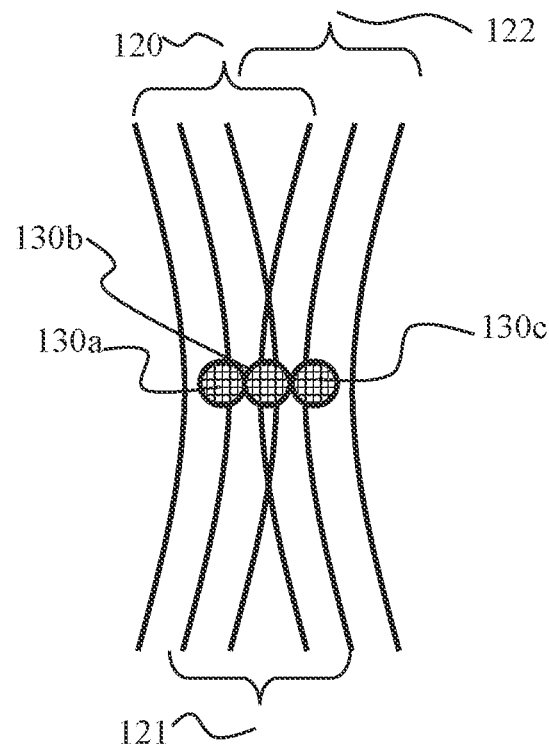

As shown in FIG. 7c, curing beams 160, 161, and 162 may be applied to simultaneously cure particles 130a, 130b, and 130c, thereby resulting in a cured printed structure comprising cured particles 130a, 130b, and 130c as shown in FIG. 7d. In one embodiment, this simultaneous curing may happen in the air.

In one embodiment, an OTP printer may be handheld, e.g., a light-wand that prints as a user waves it through the air. Print material could be pumped to the wand through tubes or the printer could take particles from the environment. For example, at the wand tip a scanning beam could identify carbon-based pollution in the environment (beams of various wavelengths could even perform spectroscopy on the sample), another beam could trap that particle and bring it to another location where the particle could be joined with other particles, possibly under high heat and pressure from laser sources or from structures within the wand to form another particle (e.g., a diamond) which could then be trapped (e.g., nanodiamond trapping has been described in available literature) and then used as printing material. The end effect could be to use a light wand that, when waved in the air, pulls in air pollution and converts it into structures made of diamond (similar to a Beijing air cleaning tower project from Danish designers).

In a related embodiment, an OTP printer could act like a sponge, collecting particles that pass by in the air (or particles in water or another fluid or medium), and using beams to trap, analyze, process, sort and then place particles. In this manner, an OTP printer could absorb and process raw material, and create refined structures from the processed material.

Figure 8A:
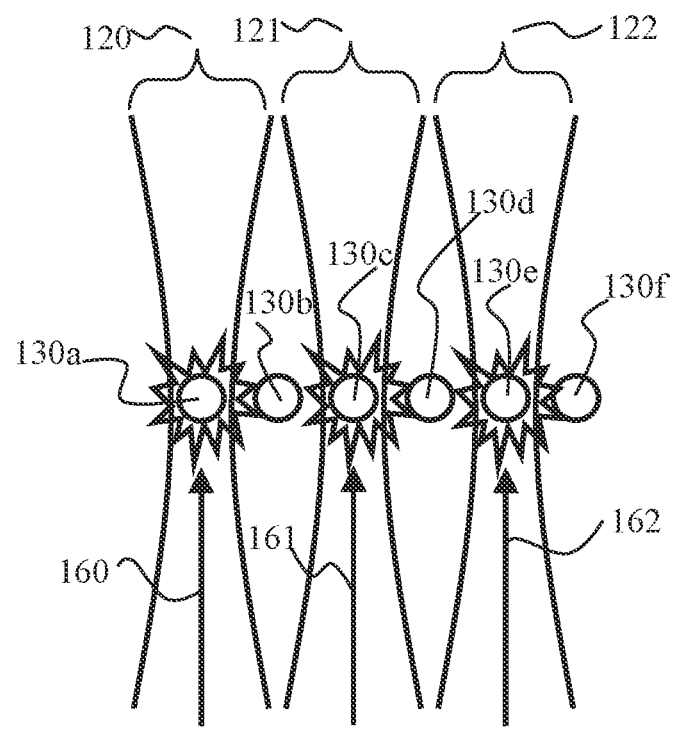
FIGS. 8a-d illustrate an exemplary OTP embodiment in which particles are cured in waves to prevent, control, or exploit interference resulting from exothermic heat release from the curing of one or more particles.
Figure 8B:
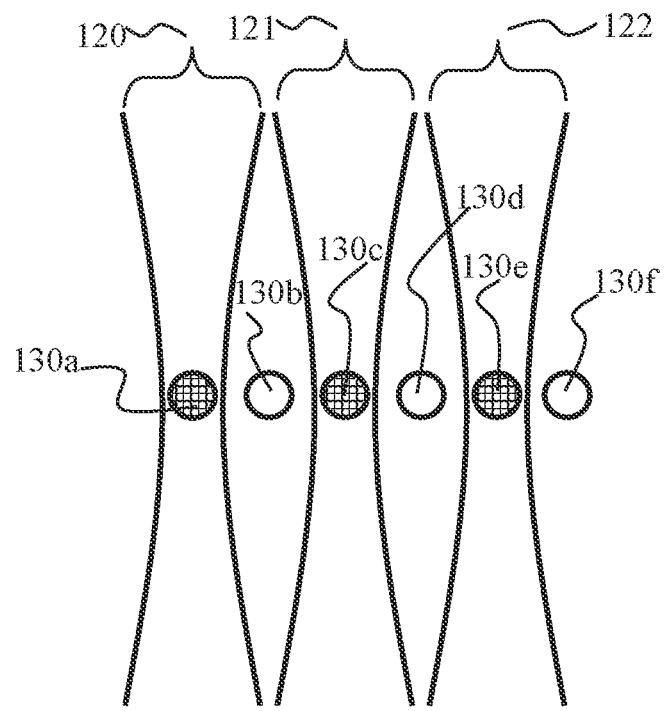
Figure 8C:
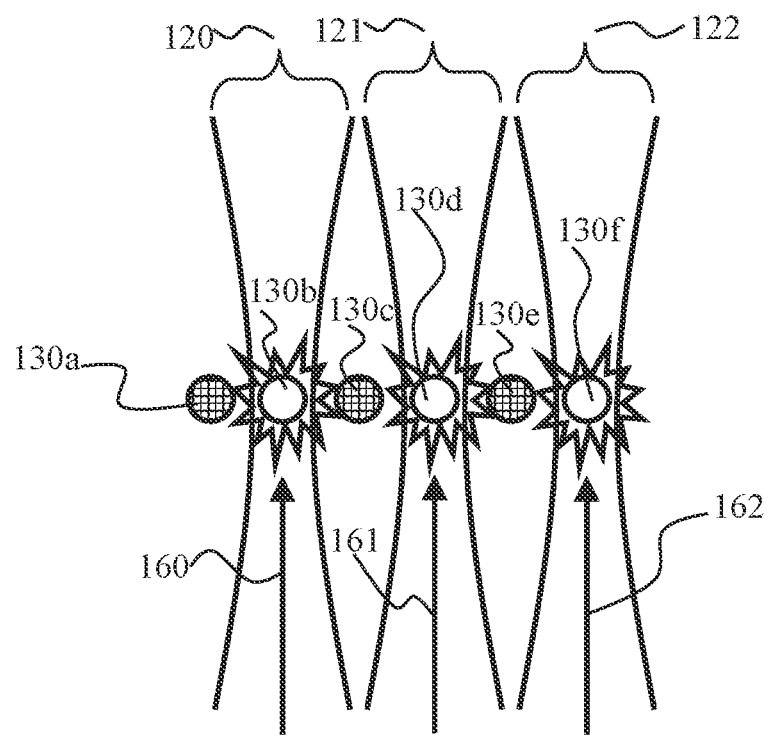

In one embodiment, and as shown in FIGS. 8a-c, OTP may mitigate heat release from exothermic resin particle reactions by curing only particles that are not close to each other, i.e., far enough away from each other so that the exothermic heat release from curing does not interfere with or otherwise affect curing or another resin particle. For example, curing may happen in multiple waves such that the exothermic heat release from any particle in a particular wave does not affect, or such that the effect is mitigated, curing of another particle in the same wave.

Figure 8D:
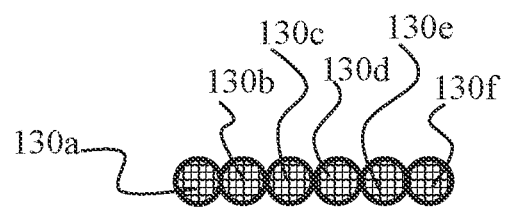

As shown in FIGS. 8a-c, using OTP a first wave of particles 130a, 130c, and 130e may be trapped by trapping beams 120, 121, and 122 and cured by curing beams 160, 161, and 162. Curing particles 130a, 130c, and 130e, which are not adjacent to each other, may prevent undesirable effects to the curing process that may occur if, e.g., particles 130a and 130b were cured simultaneously. Because particles 130a and 130b and spatially adjacent to each other, exothermic heat release from the curing of particle 130a could affect the curing characteristics and/or outcome of the simultaneous curing of particle 103b and vice versa. As shown in FIG. 8c, particles 130b, 130d, and 130f may be cured in a wave that is subsequent to the wave in which particles 130a, 130c, and 130e are cured. The result may be the printed structure, comprising particles 130a-f, as shown in FIG. 8d. Depending on multiple factors, e.g., particle properties, trapping beam properties, curing beam properties, environmental properties, and particle arrangement patterns, the curing waves or other curing pattern may be adjusted to account for avoiding undesirable effects of exothermal heat release from curing a particle, or possibly exploiting exothermal heat release from curing a particle.

Figure 9A:
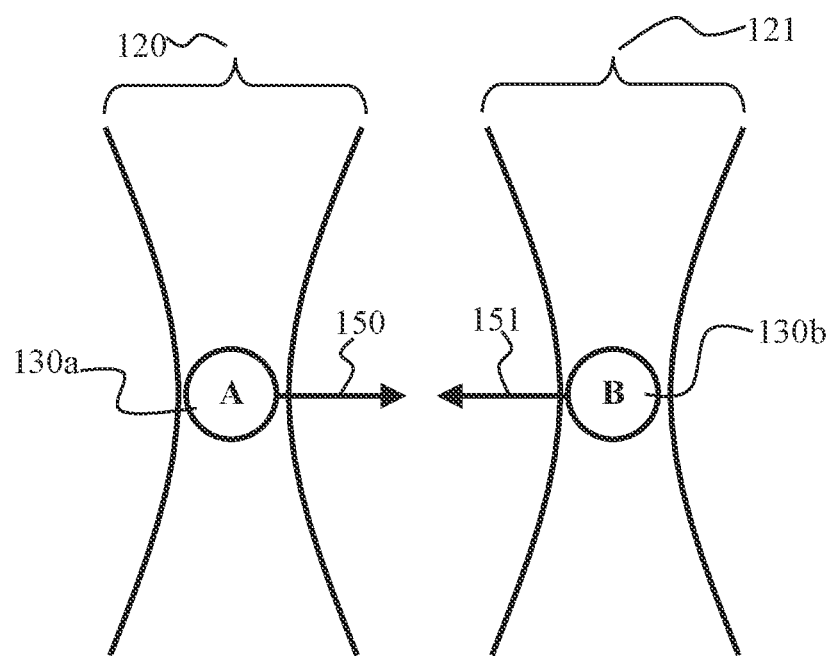
FIGS. 9a-d illustrate an exemplary OTP embodiment in which particles may be combined in situ during the printing process, e.g., becoming light sensitive only when combined.
Figure 9B:
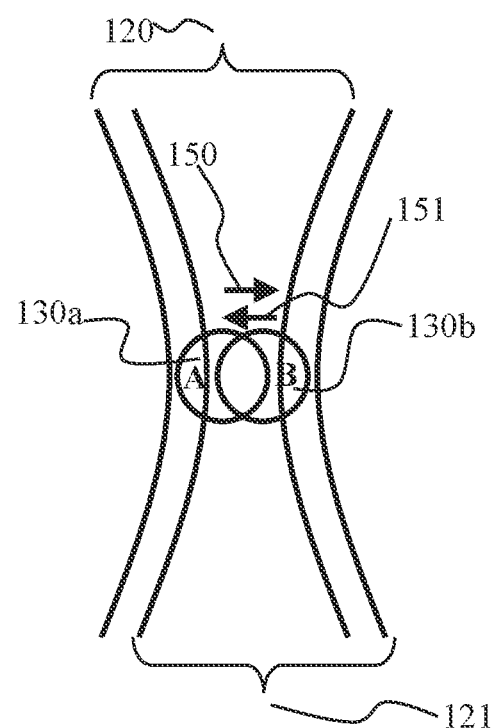
Figure 9C:
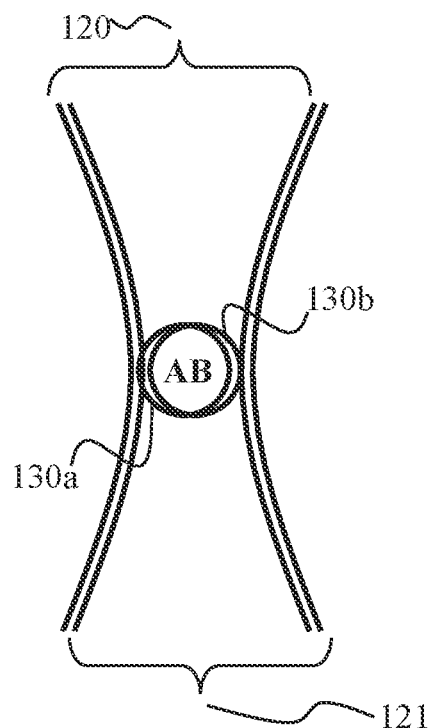
Figure 9D:
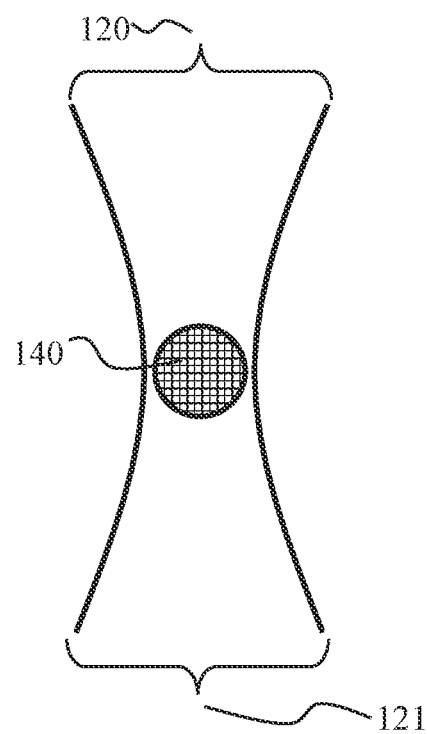

In one embodiment, as shown in FIGS. 9a-d, printing materials and chemicals may be combined in-situ and on-demand during the printing process. Such an approach may be useful in an environment flooded with UV light, e.g., sunlight. As shown in FIGS. 9a-d, resin particles may comprise both "A" particles and "B" particles, which may become light sensitive only when combined. In this situation, trapping beams 120 and 121 may be used to drag "A" particle 130a and "B" particle 130b along paths 150 and 151 toward each other as shown in FIGS. 9a-d. As shown in FIGS. 9c and 9d, when "A" particle 130a and "B" particle 130b are sufficiently close, they may combine, e.g., through a chemical reaction or other interaction, and when they combine, they may become sensitive to ambient curing light in the surrounding environment, thereby causing the combined particle 140 to be cured. Curing light may be UV light. Depending on the characteristics of particles and other factors, different types of light may be used for, or may cause, or may support, or may otherwise be involved with, curing. Using this approach, OTP may control curing timing and location by combining "A" and "B" particles only at the appropriate time and location for curing particles on a print, or otherwise transforming or altering particles.

Trapping could alternatively be carried out in fluids other than air. For example, trapping may be carried out in liquids, including but not limited to water, resin, or alcohol, or in other fluids or environments. In such alternative fluids or environments, particles could also be manipulated, and structures printed, as disclosed herein.

In one embodiment, OTP could take place inside the human body, using inserted materials or materials from the human body itself, perhaps with one of the illumination beams providing cauterization at high resolution. In a subtractive mode the light could cut out and trap particles of body tissue and move them like "light vesicles" to a storage location. For example, light could be used to cut out plaque on the inside of an artery, trap it (perhaps while light is used to scan and check for any debris that might also need capture) and them move it to a receptacle on the catheter. At the same time light traps could deliver small amounts of blood thinner to prevent clotting near the active site.

Figure 10:
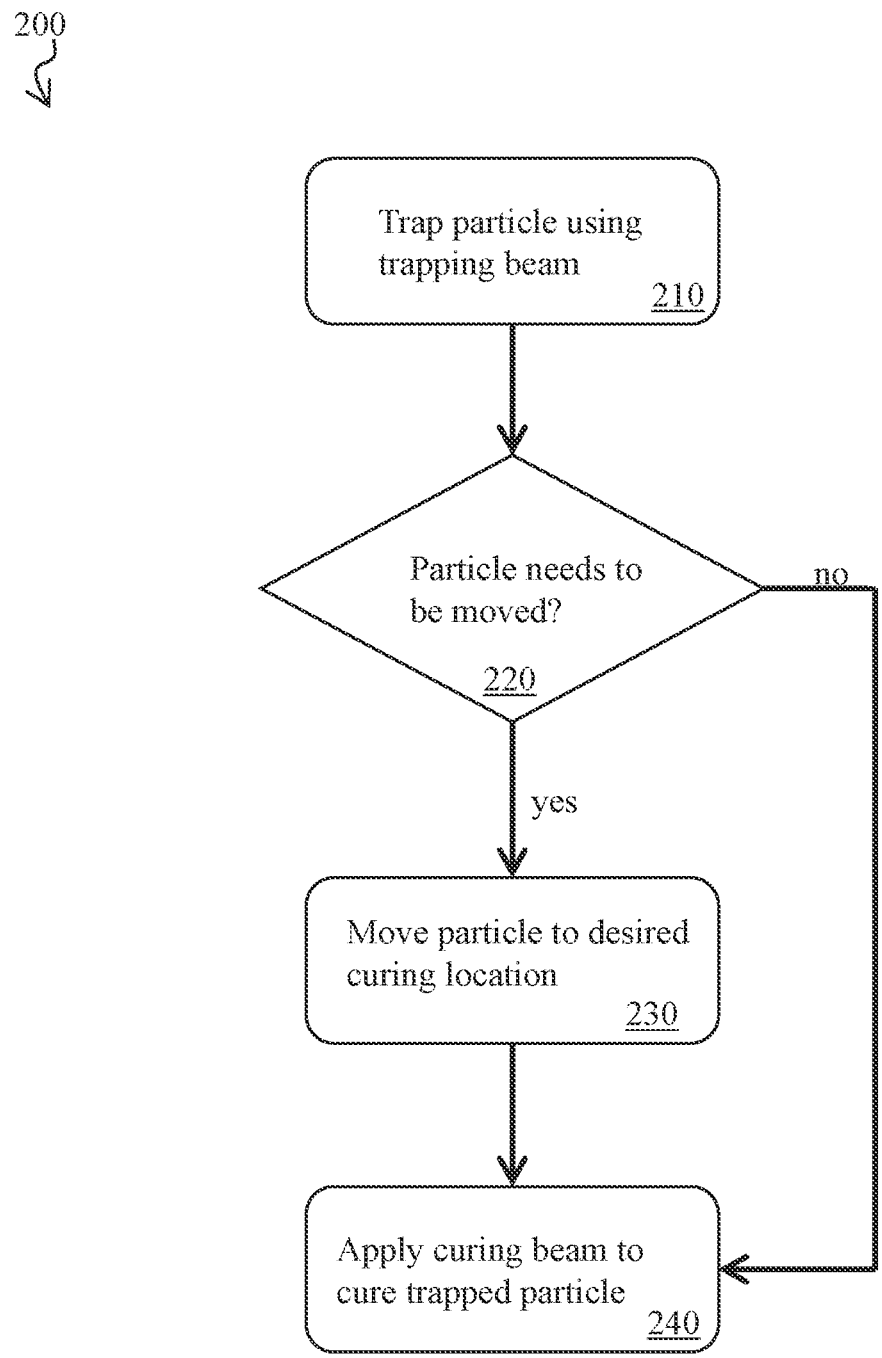
FIG. 10 is a flowchart illustrating an exemplary process for carrying out OTP as disclosed herein.
Figure 11:
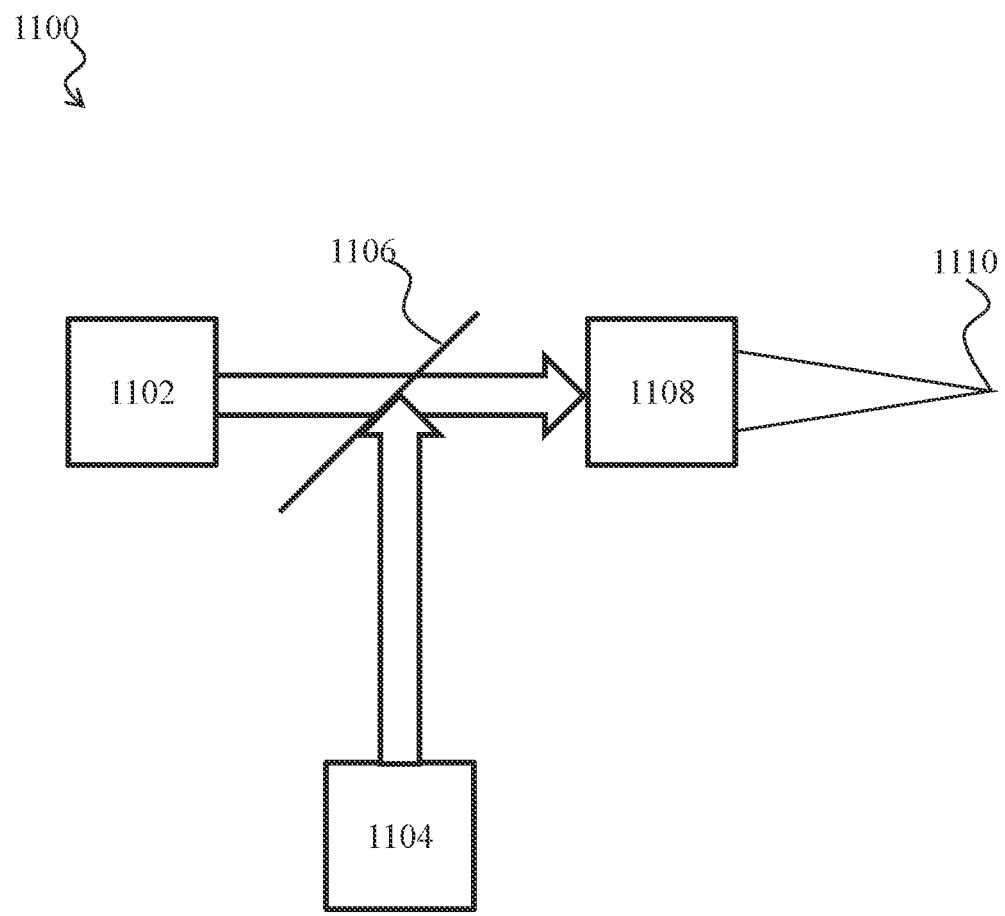
FIG. 11 shows an exemplary basic OTP system.
Figure 12:
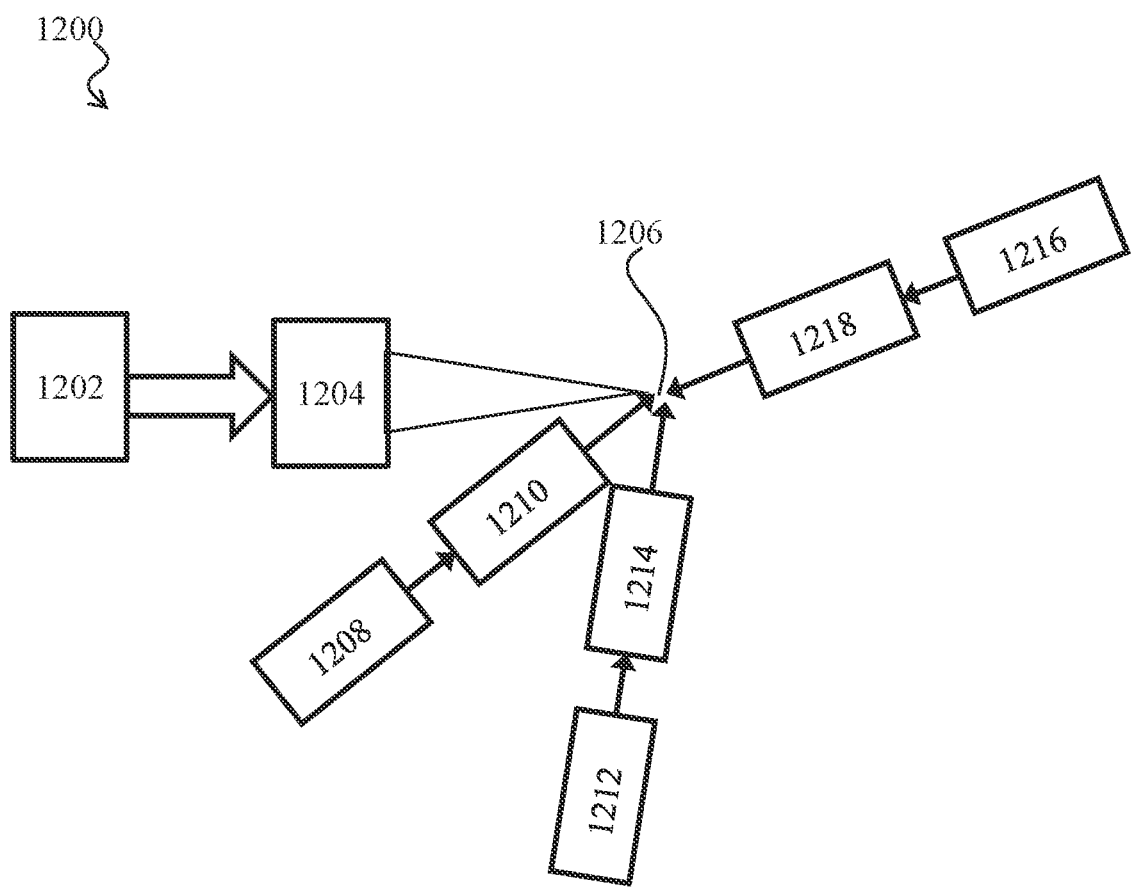
FIG. 12 shows an exemplary OTP system comprising multiple second light sources.
Figure 13:
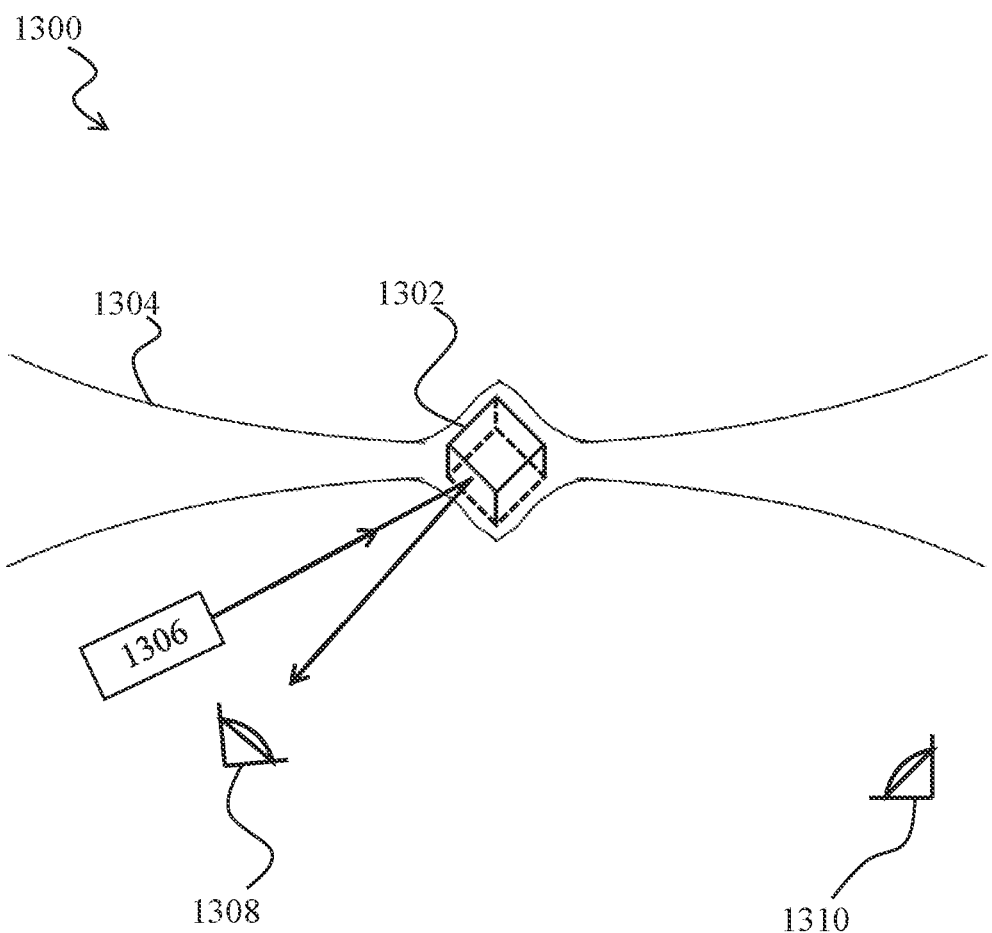
FIG. 13 shows how an anisotropic particle may be trapped in the waist of a beam.

FIG. 10 shows a flowchart for an exemplary method for printing a particle using OTP.

At Step 210, a particle is trapped using a trapping beam.

At step 220, a decision is made as to whether the particle needs to be moved before being cured.

At step 230, if the particle needs to be moved, then the particle is moved by the trapping beam to the desired location.

At step 240, once the particle is at its desired location, a curing beam is used to cure the particle, which may comprise adding the particle to a structure being printed.

What is claimed is:

1. A system, comprising:
   a first particle susceptible to being trapped in an electromagnetic beam, and further susceptible to being cured in response to stimulation by an electromagnetic beam;
   a first electromagnetic radiation source configured to generate a first electromagnetic beam for trapping the first particle; and
   a second electromagnetic radiation source configured to emit electromagnetic radiation for curing the first particle;
   wherein:
      the first electromagnetic radiation source is configured to generate the first electromagnetic beam for trapping the first particle in a potential well created by the first electromagnetic beam in a medium, wherein the medium is air or water; and
      the potential well created by the first electromagnetic beam is associated with a focal point of the first electromagnetic beam.

2. The system of claim 1, wherein the first electromagnetic radiation source is not co-located with the second electromagnetic radiation source.

3. The system of claim 1, further comprising beam scanning optical elements configured for translating a focal point of the first electromagnetic beam.

4. The system of claim 1, wherein the first particle is a liquid, solid, or hybrid of a liquid and solid.

5. The system of claim 1, further comprising a second particle susceptible to being cured in response to stimulation by an electromagnetic beam.

6. The system of claim 5, wherein the first particle differs from the second particle in color, phase, or a material property.

7. The system of claim 5, wherein:
   the first particle is a material that is different from the material of the second particle; and
   the first particle and the second particle create a composite material, or a component of a composite material, when cured adjacent to each other.

8. The system of claim 1, further comprising a modification electromagnetic radiation source configured to emit electromagnetic radiation for performing at least one of the following operations on the first particle in a trapped state: adding material, removing material, sintering, adding chemicals, cooking, electrically or optically activating, activating a nonlinear process in the first particle, altering the color, carbonizing or otherwise changing the conductance, changing the adhesive qualities, adding momentum, physically reorienting or manipulating, analyzing, counting, and capturing the shape.

9. A system, comprising:
- a first particle susceptible to being trapped in an electromagnetic beam, and further susceptible to being cured in response to stimulation by an electromagnetic beam;
- a first electromagnetic radiation source configured to generate a first electromagnetic beam for trapping the first particle;
- a second electromagnetic radiation source configured to emit electromagnetic radiation for curing the first particle;
- wherein the first particle is from an ambient environment.

10. The system of claim 9, wherein the first electromagnetic radiation source is not co-located with the second electromagnetic radiation source.

11. A method, comprising:
- using a first trapping electromagnetic radiation source to trap a first particle;
- using a first curing electromagnetic radiation source to cure the first particle; and
- prior to curing the first particle, using the first trapping electromagnetic radiation source to move the trapped first particle to a target location.

12. The method of claim 11, wherein the first trapping electromagnetic radiation source is not co-located with the first curing electromagnetic radiation source.

13. The method of claim 11, wherein the first particle is cured to become part of a printed structure.

14. The method of claim 13, wherein the first particle is cured as part of a feature of the printed structure and the feature has a resolution of less than 10 µm.

15. The method of claim 11, further comprising, prior to curing the first particle, using the first trapping electromagnetic radiation source and/or a second trapping electromagnetic radiation source to orient the first particle.

16. The method of claim 11, further comprising:
- using the first trapping electromagnetic radiation source or a second trapping electromagnetic radiation source to trap a second particle;
- using the first curing electromagnetic radiation source or a second curing electromagnetic radiation source to cure the second particle adjacent to the first particle such that both the first particle and the second particle are cured, and the first particle and the second particle are both part of a printed structure.

17. The method of claim 16, wherein the color of the cured first particle is different from the color of the cured second particle.

18. The method of claim 16, wherein:
- the material of the first particle is different from the material of the second particle; and
- the cured first particle and cured second particle together comprise a composite material or a component of a composite material.

19. The method of claim 16, wherein:
- using the first trapping electromagnetic radiation source or the second trapping electromagnetic radiation source to trap the second particle comprises using the second trapping electromagnetic radiation source;
- using the first curing electromagnetic radiation source or the second curing electromagnetic radiation source to cure the second particle adjacent to the first particle comprises using the second curing electromagnetic radiation source; and
- the first particle and the second particle are cured simultaneously.

20. The method of claim 16, wherein:
- the first particle is cured as part of a curing of a first wave of particles;
- the second particle is cured as part of a curing of a second wave of particles; and
- the curing of the first wave of particles and the curing of the second wave of particles are timed based at least in part on exothermic heat release resulting from the curing of the first particle or from the curing of the second particle.

21. The method of claim 11, further comprising using a modification beam to perform at least one of the following operations on the trapped first particle: adding material, removing material, sintering, adding chemicals, cooking, electrically or optically activating, activating a nonlinear process in the first particle, altering the color, carbonizing or otherwise changing the conductance, changing the adhesive qualities, adding momentum, physically reorienting or manipulating, analyzing, counting, and capturing the shape.

22. A method for printing a 3D structure, comprising:
- using a first trapping electromagnetic radiation source to trap a first particle;
- using the first trapping electromagnetic radiation source to move the trapped first particle to a location that is sufficiently near a second particle such that the first particle interacts with the second particle to create a third particle; and
- wherein:
  - the first particle is not susceptible to a curing process;
  - the second particle is not susceptible to the curing process; and
  - the third particle is susceptible to the curing process.

* * * * *